United States Patent Office 3,454,534
Patented July 8, 1969

3,454,534
PREPARATION OF NYLON WITH POLYALKYLENE GLYCOL DIAMINE AS ADDITIVE
Lawrence W. Crovatt, Jr., Raleigh, N.C., assignor to Monsanto Company, St. Louis, Mo., a corporation of Delaware
No Drawing. Filed Aug. 12, 1964, Ser. No. 389,213
Int. Cl. C08g 20/24, 20/20
U.S. Cl. 260—78    4 Claims

ABSTRACT OF THE DISCLOSURE

The hydrophilic characteristics of nylon 66 are improved by adding a polyalkylene glycol diamine to the molten polymer prior to spinning.

---

This invention relates to fiber-forming polyamides and fibers obtained therefrom. More particularly, the invention relates to a modified polyhexamethylene adipamide polymer and fibers derived therefrom having a novel hydrophilic property.

It is known that fibers produced from unmodified polyhexamethylene adipamide (nylon 66) are hydrophobic in character. That is to say, these fibers resist moisture and will not absorb or pick-up the same to any appreciable extent. This deficiency is one of the reasons why fibers of this type have not found greater use and acceptance in the textile industry for undergarments worn next to the skin. What is needed, therefore, is a fiber of increased moisture pick-up and moisture retention capacity.

Accordingly, it is an object of the present invention to provide a modified polyhexamethylene adipamide polymer and fibers produced therefrom which possess an increased moisture pick-up capacity and increased moisture retention capacity.

Other objects and advantages will become apparent in the course of the following detailed description of the invention and the claims appended thereto.

In general, these objects are attained by adding a modifying agent to the polymer forming reactants during the course of polymerization. This modifying agent is a polyalkylene glycol diamine of the following general formula:

$$H_2N-(CH_2)_3-O\text{-}R-O\text{-}_x(CH_2)_3-NH_2$$

wherein R is an alkylene hydrocarbon radical having a chain length of from 2 to about 8 carbon atoms; and $x$ is an integer sufficiently large to confer a molecular weight of at least 1,000 to the polyalkylene glycol diamine. The polyalkylene glycol diamine is added in an amount of from about 0.3 to 3.0 percent based on the weight of the polyamide formed. The preferred concentration of this modifying agent is from 0.3 to about 1.5 weight percent.

Introduction of the additive should be made late in the polymerization cycle or during what is known as the finishing stage or holding cycle of the polymerization. It has been found that if the additive is added to the polymerization system previous to these points, undesirable foaming in the polymerization reactor takes place.

Examples of polyalkylene glycol diamines included within the scope of the afore-noted general formula and which are suitable for the purposes of the present invention are polyethylene glycol diamine, polypropylene glycol diamine, polybutylene glycol diamine, polypentylene glycol diamine, and etc. The alkylene radical present in the polyalkylene glycol diamine may be either straight-chained or branched.

The modified polyamides described herein are prepared by procedures well known in the art and commonly employed in the manufacture of unmodified nylon 66 polymers. That is, the reactants are heated at a temperature of from 180° C. to 300° C., and preferably from 200° C. to 295° C. until the product has a sufficiently high molecular weight to exhibit fiber forming properties. This condition is reached when the polyamide has an intrinsic viscosity of at least 0.4, the intrinsic viscosity being defined as:

in which $N_r$ is the relative viscosity of a dilute solution of the polymer in m-cresol in the same units and at the same temperature and C is the concentration in grams of polymer per 100 cc. of solution. The reaction can be conducted at super-atmospheric, atmospheric, or sub-atmospheric pressure. Often it is desirable, especially in the last stage of the reaction, to employ a reduced pressure to aid in the removal of the reaction by-product. Preferably the reaction is carried out in the absence of oxygen, e.g., in an atmosphere of nitrogen. The hexamethylene diamine and adipic acid polyamide forming reactants are normally introduced into the autoclave as a preformed salt but may be uncombined when added. The resulting polymers may be formed into fibers by conventional spinning and drawing procedures.

Additive agents such as delustrants, anti-oxidants, plasticizers, viscosity stabilizers, chain terminators, and other like materials may be used to advantage by incorporation with the polymer compositions.

In order to illustrate the invention and advantages therefore with greater particularity the following examples are given. It should be understood that they are intended to only be illustrative and not limitative. Parts and percents are given by weight unless otherwise indicated.

EXAMPLE I

This example illustrates the preparation of filaments from an unmodified nylon 66 polymer, and will be used as a standard of comparison with the filaments prepared from the improved polyamide of this invention.

A solution of 147 parts of hexamethylene diammonium adipate (nylon 66 salt) dissolved in 153 parts of water was added to a stainless steel evaporator which had previously been purged of air with purified nitrogen. This evaporator was so positioned that the contents thereof could be piped into a high-pressure autoclave when desired. The solution was then heated under a nitrogen blanket at a pressure of 13 p.s.i.g. with the continuous removal of steam condensate until the salt solution reached the temperature of 137° C. At this point the salt solution was charged to a stainless-steel, high-pressure autoclave which had been previously purged of air by the use of purified nitrogen. The temperature and pressure were slowly raised until values of 220° C. and 250 p.s.i.g., respectively, were reached. The temperature was then increased to 243° C. with the pressure being maintained at 250 p.s.i.g. by the removal of steam as condensate. At this point the pressure reduction cycle began. The pressure was gradually reduced to atmospheric over a 25 minute period and the polymer melt was allowed to equilibrate for 30 minutes at 278° C.

Upon completion of the reaction the finished polymer which had a relative viscosity of 32.4, was extruded directly from the autoclave through a 10-hole spinneret yielding a white multi-filament yarn. When drawn at a draw ratio of 5.05:1, this yarn of 12.3 denier per filament exhibited a tenacity of 5.2 grams per denier and an elongation of 22 percent.

EXAMPLE II

This example illustrates the preparation of filaments from a polymer modified in accordance with this invention, i.e., polyhexamethylene adipamide modified by a small amount of polypropylene glycol diamine.

A solution of 147 parts of hexamethylene diammonium adipate dissolved in 153 parts of water was added to a stainless steel evaporator which was previously purged of air with the use of purified nitrogen. The evaporator was positioned above a stainless-steel high-pressure autoclave and equipped with means of dropping the contents thereof into the autoclave when desired. This solution was then heated under a nitrogen blanket at a pressure of 13 p.s.i.g. with continuous removal of steam as condensate until the salt solution reached a temperature of 137° C. At this point the salt solution was charged to the autoclave. The temperature and pressure were slowly raised until values of 220° C. and 250 p.s.i.g., respectively, were reached. The temperature was then further increased to 243° C. and the pressure was maintained at 250 p.s.i.g. by the continuous removal of steam as condensate. At this point the pressure reduction cycle began. The pressure was gradually reduced to atmospheric during a 25 minute period; at the end of which 0.5 percent (based on the weight of the polymer) of polypropylene glycol diamine was added to the polymer melt, by mixing and stirring over a period of 30 minutes during which time the temperature was maintained at 278° C.

The resulting polymer had a relative viscosity of 45.8. This final molten polymer was melt spun directly from the autoclave through a 10-hole spinneret yielding a white multi-filament yarn. The yarn was godet drawn over a hot (90° C.) pin to yield filaments having a 9.2 denier, and a tenacity of 7.7 grams per denier at an elongation of 27 percent.

In order to illustrate the practical usefulness of the improved polyamides of the present invention comparative tests of the fibers of the above examples were conducted to determine moisture pick-up or moisture regain. Fiber samples of the above examples were first partially dried to insure that the moisture content therein was well below the moisture content that would be present at standard atmospheric conditions. After this partial drying the samples were conditioned at 25° C. in an atmosphere of 65 percent relative humidity for a period of 48 hours. Following the conditioning the samples were immediately weighed. Subsequently, these yarn samples were dried in a vacuum oven maintained at 60° C. for a period of 24 hours. The samples were then weighed in this dry condition. Calculations were made to determine percent moisture pick-up by taking the difference between the wet and dried weight and dividing that weight by the dry weight as given in the following formula:

$$\text{percent moisture pick-up} = \frac{\text{wet wt. minus dry wt.}}{\text{dry wt.}}$$

The results of these tests are given in the following table:

| Example— | Percent moisture pick-up |
|---|---|
| I | 4.2 |
| II | 5.9 |

As can be seen from the results in the above table, the percent moisture pick-up for the modified polyamide fiber of this invention was substantially increased over that of control. Example I (unmodified nylon 66). The value for percent moisture regain as recorded for Example II represents a 40.5 percent improvement over that of commercial nylon 66 (Example I).

This improvement in moisture pick-up has been attained without degradation of other physical properties. That is to say, physical properties such as tenacity, elongation, and relative viscosity of these modified polyamides and fibers produced therefrom have been maintained at the same desirable levels as those exhibited by the standard commercially successful polyamide (nylon 66).

As many different embodiments would readily occur to those skilled in polymer chemistry it is to be understood that the specific embodiments of the invention as presented herein are not to be construed as limiting, but that the limitations are to be determined only from the appended claims.

I claim:

1. In a process for producing polyhexamethylene adipamide wherein substantially equimolecular proportions of adipic acid and hexamethylene diamine are reacted together at a temperature of between 180° C. and 300° C. to form molten polyhexamethylene adipamide which is thereafter melt-spun into filaments, the improvement which comprises increasing the hydrophilic characteristics of the filaments so formed by introducing into the molten polymer subsequent to polymer formation and prior to spinning, from 0.3 to 3.0 weight percent of a polyalkylene glycol diamine of the general formula $$H_2N-(CH_2)_3-O[R-O]_x(CH_2)_3-NH_2$$

wherein R is an alkylene hydrocarbon radical having a chain length of from 2 to about 8 carbon atoms, and $x$ is an integer sufficiently large to confer a molecular weight of at least 1000 to the polyalkylene glycol diamine.

2. The process as set forth in claim 1 wherein said polyalkylene glycol diamine is polyethylene glycol diamine.

3. The process as set forth in claim 1 wherein said polyalkylene glycol diamine is polypropylene glycol diamine.

4. The process as set forth in claim 1 wherein said polyalkylene glycol diamine is polybutylene glycol diamine.

References Cited

UNITED STATES PATENTS

| 2,359,867 | 10/1944 | Martin | 260—78 |
| 2,880,197 | 3/1959 | Coleman | 260—78 |
| 2,892,816 | 6/1959 | Lowe et al. | 260—78 |
| 2,939,862 | 6/1960 | Caldwell et al. | 260—78 |
| 3,083,188 | 3/1963 | Stuart et al. | 260—78 |
| 3,236,895 | 2/1966 | Lee et al. | 260—78 |

FOREIGN PATENTS

| 948,507 | 2/1964 | Great Britain. |

HAROLD D. ANDERSON, *Primary Examiner.*

U.S. Cl. X.R.

57—140; 260—95; 264—210